United States Patent [19]
White

[11] 3,738,032
[45] June 12, 1973

[54] DIGGER TOOTH RETAINER

[75] Inventor: Kenneth M. White, Calgary, Alberta, Canada

[73] Assignee: Western Rock Bit Company Limited, Alberta, Canada

[22] Filed: Sept. 29, 1970

[21] Appl. No.: 76,434

[52] U.S. Cl. ................ 37/142 A, 287/126, 306/29
[51] Int. Cl. ............................................. E02f 9/28
[58] Field of Search .................. 37/142; 287/126, 287/DIG. 2; 306/29, 33; 200/168 G

[56] References Cited
UNITED STATES PATENTS

| | | | |
|---|---|---|---|
| 2,475,404 | 7/1949 | Reed | 200/168 G |
| 3,043,148 | 7/1962 | Krueger | 200/168 G |
| 1,171,267 | 2/1916 | Smith | 287/126 X |
| 2,133,871 | 10/1938 | Reed | 287/126 |
| 3,359,021 | 12/1967 | Wurzel et al. | 287/126 |
| 3,466,772 | 9/1969 | Phillips | 287/126 X |
| 3,471,954 | 10/1969 | Spivey | 37/142 A |

Primary Examiner—Edgar S. Burr
Attorney—Smart & Biggar

[57] ABSTRACT

A retainer for mounting a digger tooth in excavating equipment comprises a disk of resilient material, plastic, polyurethane or rubber for example, which has a convexly shaped upper side and an underside formed with a concave recess. The digger tooth has a shank portion by means of which it is mounted in an opening of a tooth mounting pocket in an excavating machine, the tooth being supported by inter-engagement of mating surfaces on the shank and the pocket opening. The retainer is received in a shallow circular recess in a surface of one of these members and is engaged against the mating surface in the other member, the convexly shaped upper portion of the retainer being displaced resiliently downwards by this engagement, and the material thus displaced filling recess on the underside of the retainer. When mounted the retainer presses in opposite directions against the tooth shank and the pocket and acts to secure the tooth in its mounting. To facilitate insertion of the tooth shank in its mounting the upper side of the retainer is defined by two sloping surfaces, the thickness of material beneath one of the surfaces being reduced to provide a place where the upper side of the retainer can buckle downwards.

4 Claims, 7 Drawing Figures

PATENTED JUN 12 1973 3,738,032

INVENTOR
KENNETH M. WHITE

BY *Smart & Biggar*

ATTORNEYS 3,738,032

DIGGER TOOTH RETAINER

BACKGROUND OF THE INVENTION

This invention relates to a new or improved retainer for mounting a digger tooth in excavating equipment, and also relates to a new or improved tooth mounting arrangement.

In my co-pending application No. 9,274 filed Feb. 3rd, 1970 there is described a tooth mounting arrangement having a retainer in the form of a short helical spring, preferably a lock washer, received in a circular recess in a tooth shank with its ends pressing in opposite directions against the tooth shank and the pocket in which the tooth is mounted.

SUMMARY OF THE INVENTION

The present invention provides a retainer for mounting a digger tooth in excavating equipment, comprising a body of resilient material having a peripheral portion throughout which the thickness of the body is substantially uniform, the body being generally flat but having an upper side which is convexly shaped and an underside formed with a concave recess, whereby the body is adapted to be inserted between two parallel surfaces having a spacing corresponding to said peripheral thickness, the convexly shaped upper side of the body being displaced resiliently downwards to be accommodated in said recess when the body is thus inserted.

Preferably the retainer is of disk-like configuration and the convexly shaped upper side comprises two inclined surfaces which meet at a crest line, one of the inclined surfaces lying at a smaller inclination than the other and having a lesser thickness of material to facilitate insertion of the tooth is its mounting, the crest line thus lying at a position displaced from the central area of the retainer.

The retainer may be fabricated in any suitable resilient material, but preferably is of plastic, polyurethane or rubber.

From another aspect the invention provides a tooth mounting employing a retainer of the type described above. The tooth has a shank which is received in an opening in a tooth mounting pocket, the shank having at least one longitudinally extending surface which engages against a mating surface of the pocket opening, one of the mating surfaces being formed with a shallow recess of a shape to receive the retainer with the underside of the retainer engaging a bottom surface of the recess so that only the convexly shaped upper side of the retainer projects above the recess. Upon insertion of the tooth shank into the pocket opening the convexly shaped portion of the retainer is engaged against the other of the mating surface and is displaced downwards into the recess formed on the underside of the retainer. In this condition the resilient force of the retainer thus deformed acts in opposite directions against the pocket and the tooth shank and is operative to retain the tooth in its mounting.

BRIEF DESCRIPTION OF THE DRAWINGS

The invention will further be described, by way of example only, with reference to the accompanying drawings in which.

DESCRIPTION OF THE PREFERRED EMBODIMENT

Figure 1:
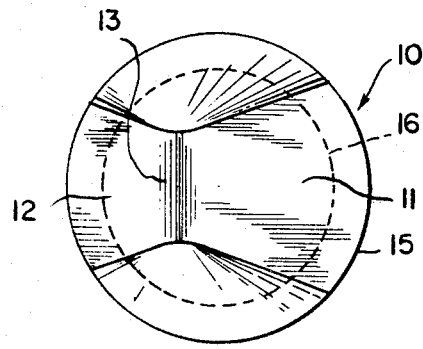
FIG. 1 is a plan view of a resilient retainer according to the invention.

Referring to FIG. 1 the resilient retainer 10 comprises a disk-like body of circular form having a convexly shaped upper portion defined by sloping surfaces 11 and 12. The retainer 10 may be fabricated in any suitable resilient material, conveniently plastic, rubber or polyurethane. The sloping surfaces 11 and 12 meet in a crest line 13, and as will be observed in FIG. 2 the surface 11 lies at a smaller inclination to the base 14 of the retainer than the surface 12 so that the crest line 13 lies in a position displaced from the central area of the retainer towards one side of the periphery 15 thereof. As will be seen in FIG. 2 the periphery 15 of the retainer is of uniform height and the underside is formed with a concave recess 16.

Figure 2:
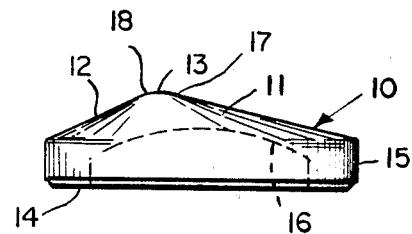
FIG. 2 is a side view of the retainer.

The upper portions of the sloping surfaces 11 and 12 may be slightly curved in the region of the crest line 13, as indicated at 17 and 18 in FIG. 2, to provide a smoother transition between these surfaces. Indeed there is no requirement that the crest line 13 should be identifiable as a clearly defined line on the retainer. It will be seen that, due to the offset position of the crest line 13, the thickness of material beneath the surface 11 is less than that beneath the surface 12. As will be described, in use this assists the resilient deformation of the retainer.

Figure 3:
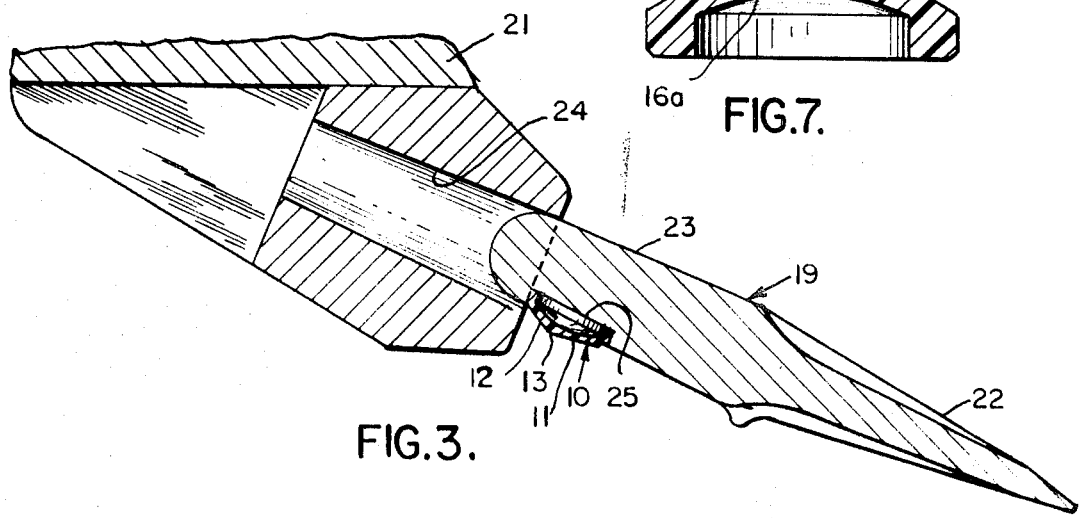
FIG. 3 is a longitudinal sectional view, to a smaller scale, showing a tooth mounting arrangement according to the invention just prior to insertion of the tooth in its mounting pocket.
Figure 4:
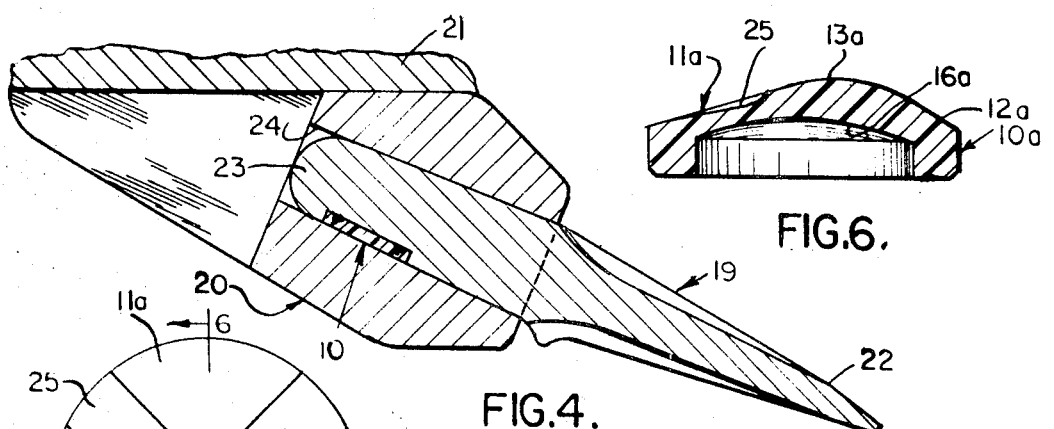
FIG. 4 is a view corresponding to FIG. 3 showing the tooth in its mounted condition.

FIGS. 3 and 4 illustrate the method of use of the retainer 10 in securing a trencher tooth 19 in its mounting in a pocket 20 secured to the lip 21 of the trenching machine bucket (not shown). The trencher tooth 19 comprises a tip portion 22 and a shank 23 by means of which the tooth is adapted to be supported in an opening 24 in the pocket 20. The shank 23 is of generally rectangular cross section with rounded corners and tapers slightly towards its rear end, the opening 24 being correspondingly shaped so that when the tooth is mounted in the pocket mating surfaces on the shank 23 and opening 24 interengage. In one of these mating surfaces, on the tooth as illustrated, a circular recess 25 is formed to receive the retainer 10 the depth of the recess 25 being equal to the height of the periphery 15 of the disk. Therefore when the retainer 10 is inserted in the recess 25, as indicated in FIG. 3, only the convexly shaped upper side of the retainer projects from the recess 25. The retainer 10 is positioned in the recess 25 with the crest line 13 extending transversely to the longitudinal direction of the tooth and the sloping surface 11 presented forward away from the pocket. The tooth is mounted by being moved rearwardly towards the pocket, the shank 23 being inserted fully into the opening 24. During this movement the sloping surface 12, which acts as a leading surface, is engaged by the surface of the opening 24, and as the tooth is moved towards its fully engaged position as indicated in FIG. 4, the upper portions of the retainer 10 are pressed inwardly and are displaced into the recess 16. During this movement, the reduced thickness of material beneath the surface 11 facilitates buckling inwards of this portion of the retainer. The force of the resiliently deformed retainer 10 acts in opposite directions against the pocket 20 and shank 23 and is sufficient to prevent accidental disengagement of the tooth 19 from its mounting. However should it be necessary to remove the tooth 19 from its mounting for repair or replacement this can easily be achieved by a driving force applied upon the rear end of the shanks 23 through the rear end of the pocket opening 24.

The point that the two surfaces 11 and 12 are of unequal thickness is of some importance. Since the retainer is basically a disk, due to space limitations and wear compensation requirements the structure as a whole tends to be very rigid. In order to minimize the possibility of a shear type of failure on the holding or top portion of the disk, optimum buckling conditions must be obtained from what is normally considered a shear type of loading. By using a spherical radius on the internal recess, what would normally be considered a stress concentration yields a point of preferred buckling. The surface 11 being generally longer, in terms of unsupported length, is therefore the preferred buckling face. If the disk were inserted in the tooth in such a fashion that the surface 11 was rearward a tension type failure might result when the tooth was driven into the pocket. This tension type failure would be exhibited by a shearing off of the holding or upper portion of the disk originating at the preferred buckling point.

Retainer designs have been tested in which the thickness of material under the surfaces 11 and 12 was equal. Such designs did work, but in cold weather tests it was found that the natural stiffening of the material used tended to cause a shear type of failure of the disk rather than the desired buckling, upon mounting of the tooth.

Apart from its effectiveness in retaining the trencher tooth in its mounted condition whilst facilitating removal of the tooth when required, the mounting arrangement according to the present invention provides a ready means for accommodating wear between the mating surfaces of the tooth shank 23 and the pocket opening 24. A certain degree of wear of these surfaces during extended service of the tooth mounting is inevitable and normally results in a reduced effectiveness on engagement between the tooth shank and the pocket. Previously such wear has necessitated replacement of the pockets 20 on the trenching machine which is an expensive operation since the pockets 20 are normally welded to the lip 21 of the trenching machine bucket. However with the mounting arrangement according to the present invention, a certain degree of wear between the mating surfaces of the pocket opening 24 and the tooth shank 19 can be accommodated simply by removing the tooth from its mounting, replacing the retainer 10 by a similar retainer of greater thickness and re-inserting the tooth. The added thickness of the replacement retainer is effective to take up clearance caused by wear between the mating surfaces of the tooth shank and pocket opening, and in this way the service life of the tooth mounting can be significantly lengthened.

Figure 7:
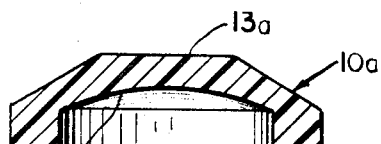
FIGS. 6 and 7 are sectional views taken on the lines 6—6 and 7—7 respectively, in FIG. 5.
Figure 6:
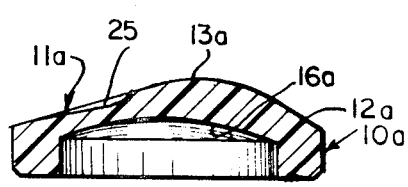
Figure 5:
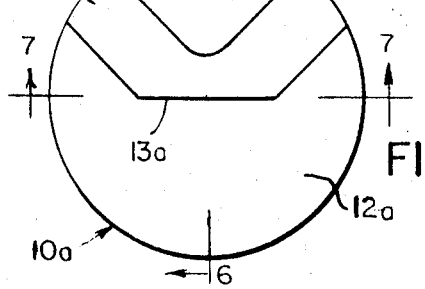
FIG. 5 is a plan view of an alternative form of resilient retainer.

A preferred form of resilient retainer 10a is illustrated in FIGS. 5 to 7. As before, the retainer 10a is generally of circular disk-like form, and is fabricated, for example by molding, from a suitable resilient material which may be rubber or a plastics material such as polyurethane. The retainer 10a has a spherically curved recess 16a on its underside and a convexly curved upper side formed by inclined surfaces 11a and 12a. As will be seen from FIGS. 5 and 7, the retainer disk 10a is symmetrical about the plane indicated by the numbers 6—6 in FIG. 5. In this embodiment, the crest line indicated at 13a in FIG. 5 is centrally situated on the retainer, but as is evident from FIG. 6, the thickness of material beneath the surface 12a is considerably greater than that beneath the surface 11a. The reduced thickness beneath the surface 11a facilitates downwards buckling of this part of the retainer during insertion of a trencher tooth in its mounting, and this effect is enhanced by the provision of a shallow V-shaped groove formed in the sloping surface 11a.

What we claim as our invention is:

1. A tooth mounting comprising in combination a digger tooth retainer comprising a disk-like body of resiliently deformable material, said body being of uniform thickness throughout its periphery and having an upper side which is convexly shaped and a flat underside formed with a central concave recess, the thickness of said body throughout the area between said concave recess and said convexly shaped side being substantially less than said uniform thickness, and the volume of said concave recess being greater than the volume of the material of said body between said recess and said convexly shaped side whereby said volume of material can be accommodated within said recess by resilient displacement thereof upon resilient deformation of the retainer to a thickness which is substantially the same as said peripheral thickness;

a digger tooth; and a tooth mounting pocket;

said digger tooth comprising a tip portion and a shank, an opening in said pocket to receive said shank and mount said tooth, said shank and said pocket including longitudinally extending mating surfaces, one of said mating surface of said shank being formed with a shallow recess of a shape to receive said retainer with the underside thereof engaging a bottom surface of the recess, said bottom surface of said recess being at a depth from said one mating surface substantially equal to the peripheral thickness of the retainer body so that when said retainer is positioned in the recess only said convexly shaped upper side projects above the recess, whereby upon insertion of said tooth shank into said pocket opening said convexly shaped portion of said retainer is engaged against the other of said mating surfaces and is displaced downwards into said recess formed on the underside of said retainer, in which condition the resilient force of said retainer thus deformed acts in opposite directions against said pocket and said tooth shank is operative to retain said tooth in its mounting.

2. A tooth mounting comprising a retainer formed by a disk-like body of resilient material, said body being of uniform thickness throughout its periphery and having an upper side which is convexly shaped and an underside formed with a concave recess, the thickness of said body throughout the area between said concave recess and said convexly shaped side being substantially less than said uniform thickness, said convexly shaped upper side of said retainer body having a crest lying parallel to the underside of said body and defined between two surfaces which extend in opposite direction from said crest lying parallel to the underside of said body and defined between two surfaces which extend in opposite direction from said crest at a downward inclination towards the periphery of said retainer body, the thickness of the material of said body beneath one of said surfaces being less than that beneath the other surface, a digger tooth comprising a shank and a tip portion, and a tooth mounting pocket formed with an opening to receive said shank and mount said tooth, said shank and said pocket including longitudinally extending mating surfaces, one of said mating surfaces of said shank being formed with a shallow circular recess to receive said retainer with the underside of said retainer engaging a bottom surface of said recess and only the convexly shaped upper side of said retainer projecting above said recess, whereby with said retainer positioned in its recess upon insertion of said shank into said pocket opening the convexly shaped upper side of said retainer is engaged against the other of said mating surfaces and is displaced downwards into the recess formed on the underside of said retainer, in which condition the resilient force of said retainer thus deformed acts in opposite directions against said pocket and said tooth shank and is operative to retain said tooth in its mounting.

3. A digger tooth retainer comprising:

a disk-like body of resiliently deformable material the body being of uniform thickness throughout its periphery and having an upper side which is convexly shaped and a flat underside formed with a central concave recess, the thickness of said body throughout the area between said concave recess and said convexly shaped side being less than said uniform thickness, said convexly shaped upper side of said body exhibits a crest lying parallel to the underside of said body, said crest occupying a position in the area of said body displaced from the center thereof and being defined by two sloping surfaces which extend in opposite directions from the crest at a downward inclination towards the periphery of said body, one of said sloping surfaces extending at a substantially smaller angle of inclination than the other, the thickness of material beneath said one surface being substantially less than that beneath the other sloping surface, and the volume of said concave recess being greater than the volume of the material of said body between said recess and said convexly shaped side whereby said volume of material can be accommodated within said recess by resilient displacement.

4. A retainer according to claim 3 wherein the periphery of said body is substantially circular.

* * * * *

UNITED STATES PATENT OFFICE
CERTIFICATE OF CORRECTION

Patent No. 3,738,032     Dated June 12, 1973

Inventor(s) Kenneth M. White

It is certified that error appears in the above-identified patent and that said Letters Patent are hereby corrected as shown below:

In the heading insert:

--Foreign Application Priority Data

November 19, 1969, Canada     067,908--

Signed and sealed this 16th day of April 1974.

(SEAL)
Attest:

EDWARD M. FLETCHER, JR.
Attesting Officer

C. MARSHALL DANN
Commissioner of Patents